United States Patent [19]

Shroff

[11] 4,147,841
[45] Apr. 3, 1979

[54] VENTED CONTAINER

[75] Inventor: Jayant R. Shroff, Morris Township, Morris County, N.J.

[73] Assignee: Bell Telephone Laboratories, Incorporated, Murray Hill, N.J.

[21] Appl. No.: 864,329

[22] Filed: Dec. 27, 1977

[51] Int. Cl.² ............................................. H01M 2/12
[52] U.S. Cl. ........................................ 429/86; 429/89
[58] Field of Search .................................... 429/86, 89

[56] References Cited

U.S. PATENT DOCUMENTS

| | | | |
|---|---|---|---|
| 2,471,585 | 5/1949 | Rittenhouse et al. | 429/86 |
| 3,507,708 | 4/1970 | Vignaud | 429/86 |
| 3,915,752 | 10/1975 | Gross | 429/86 |

FOREIGN PATENT DOCUMENTS 839808  4/1939  France ......................................... 429/86

Primary Examiner—Donald L. Walton
Attorney, Agent, or Firm—Allen N. Friedman

[57] ABSTRACT

A container for a liquid includes a gas venting closure device. The closure device includes a body of a porous material that is not wetted by the contained liquid. The nonwetting relationship between the liquid and the solid prevents droplets of the liquid from being forced through the solid. One use for such devices is for lead-acid storage batteries, which must vent internally generated gases, while preventing leakage of battery acid. An exemplary battery plug also includes a sealing gasket of an elastomer formulated for long term stability against attack by battery acid.

3 Claims, 4 Drawing Figures

VENTED CONTAINER

BACKGROUND OF THE INVENTION

1. Field of the Invention

The invention is in the field of liquid-tight but gas-vented containers. A particular contemplated use is in conjunction with storage batteries.

2. Description of the Prior Art

The use of liquid containing vessels, which vent gas while suppressing the leakage of the liquid, is widespread. For example, lead-acid storage batteries in automotive use generate gases within the electrolyte. As the battery sustains vibration during use, the internally generated gases must be vented and the battery acid must be kept, to a large extent, inside of the battery. Devices which have in the past been developed for this use include caps containing a chamber with a small hole on the fluid side and a small hole on the air side. There are also caps containing baffles of various geometries (e.g., U.S. Pat. No. 4,031,294, issued June 21, 1977). However, under conditions of violent shaking or tipping vessels with such caps are still susceptible to some spillage of the contained liquid.

In order to provide the desired leakage control it is required that the body of the plug or cap be sealed to the wall of the fluid containing vessel. Many plug designs make use of a rubber gasket to make the required seal. Many common rubbers contain constituents which can leach out of the body of the rubber, when in contact with battery acid. Common antiozonants are susceptible to such leaching. This can result in the cracking of the rubber due to ozone attack. In addition, the chemical leached into the battery acid can be deleterious to battery operation. This is particularly troublesome to batteries intended for long service life, such as standby batteries in telephone central offices.

SUMMARY OF THE INVENTION

The gas vented container of this disclosure is sealed against leakage of a liquid, while being vented for the passage of gases between the interior and the ambient. Thic container includes a porous plug of a material which is not wet by the liquid within the vessel. Any liquid coming into contact with the free surface of this porous plug, either through splashing or condensation, does not form a film on the surface but, at most, forms droplets. In accordance with the invention the pore size is selected to be too small for these droplets to be forced through the surface into the body of the porous plug. Thus the pores are kept open for the venting of gases from the container and the liquids are kept within the container. If the container is, for example, the case of lead-acid battery, hydrogen can be generated on the battery plates within the electrolyte. In this case and in other cases in which a flammable gas is being vented the pores must be selected to be too small for the propagation of a flame through the porous plug.

DETAILED DESCRIPTION

In many commonly met situations a vessel, partially filled with a liquid, contains an orifice or aperture which must be sealed against leakage of the contained liquid while it is vented for the passage of gases. These gases may be internally generated or merely result from changes in the pressure of the ambient gas. One such device is the lead-acid storage battery. Leakage of the acid must be minimized because of its corrosive nature, which makes it damaging to contacting structures and dangerous to people who must handle the battery. Other liquids which commonly require a vente cap or plug include flammable hydrocarbons (e.g., gasoline) and liquid metals (e.g., mercury).

The figures show exemplary closure devices and a vented container of the invention. Each includes a body of porous material which is not wet by the contained liquid. The pore size must be chosen such that droplets of the liquid cannot be forced into the body of the porous material under the pressure conditions met in the particular device use. For most combinations of materials and pressure conditions there will be little significant penetration of liquid into the porous material if all of the pores are less than 200 micrometers wide. A maximum dimension less than 100 micrometers will prevent the propagation of a flame in the case of combustible gases. In order to provide for gas venting at least some of these pores must form passages extending from the interior of the vessel to the exterior of the vessel. Passages less than 10 micrometers wide are usually ineffective in providing sufficient venting. In each case it is the width of the passages at their narrowest portion, which is critical.

Figure 1:
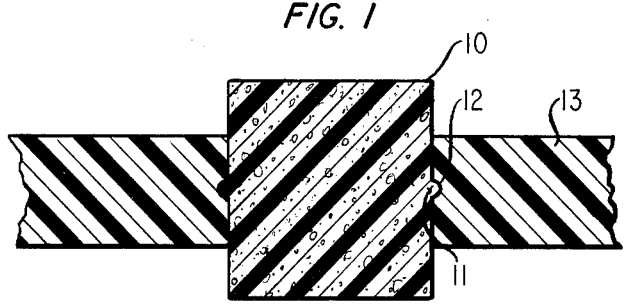
FIG. 1 is an elevational view in section of an exemplary closure device.
Figure 2:
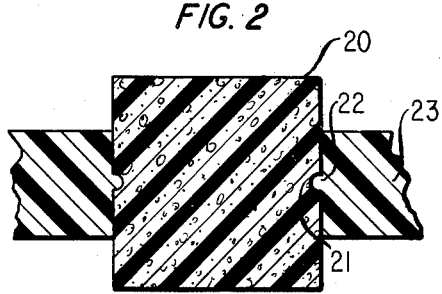
FIG. 2 is an elevational view in section of a second exemplary closure device.
Figure 3:
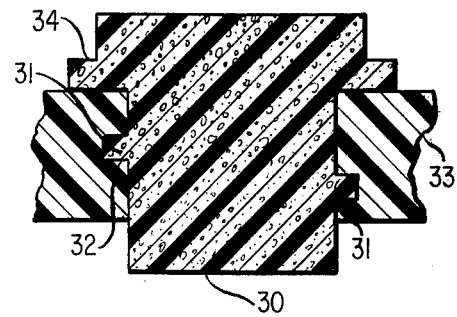
FIG. 3 is an elevational view in section of a third exemplary closure device.

Each closure device must also include some means for sealing the body of the device to the walls of the aperture being closed. In FIG. 1 the closure device is a unitary plug 10 of porous material which is sealed to the wall 13 of the vessel by means of a bead 11 which engages a groove 12 in the wall 13. In FIG. 2 the plug 20 of porous material includes a groove 21 which engages a bead 22 in the wall 23 of the vessel. In FIG. 3 the plug 30 of porous material contains a spiral thread 31 which engages a spiral groove 32 in the wall 33 of the vessel. The plug 30 is turned until the shoulder 34 is brought into contact with the wall 33. The closure device can also be permanently sealed to the wall of the vessel by, for example an adhesive or by fusion.

Figure 4:
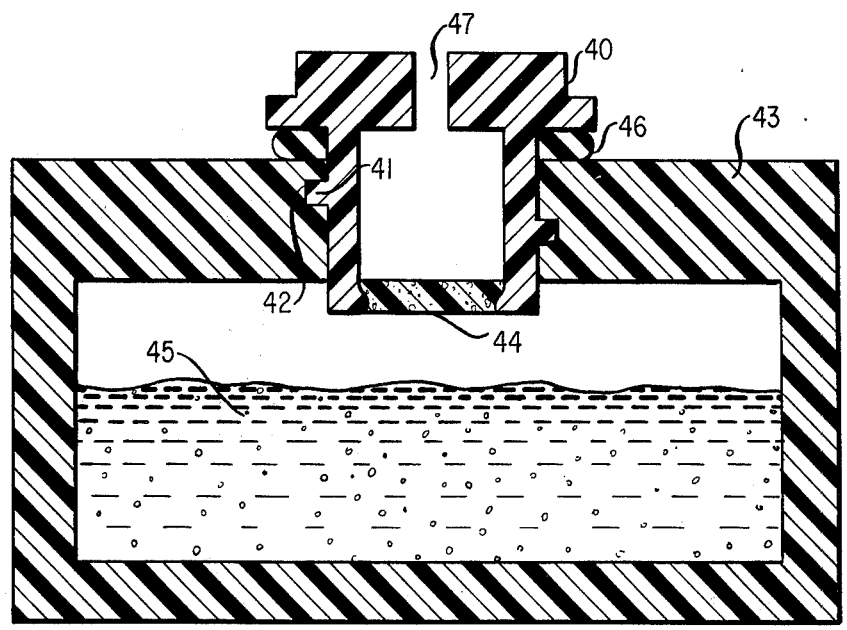
FIG. 4 is an elevational view in section of an exemplary vented container of the invention.

FIG. 4 shows a closure device of somewhat more complex design. The device includes a body 40 of a material with no significant porosity, within which there is inserted a plug 44 of a porous material adjacent to the liquid 45 contained within the vessel 43. The closure device is sealed to the vessel 43 by means of a spiral thread 41 in the plug 40 engaging a spiral groove 42 in the vessel 43. Gases are vented through the porous plug 44 and a hole 47 in the nonporous material 40.

In the device of FIG. 4 the plug body 40 is sealed to the wall of the vessel 43 by means of a compressed gasket 48. In exemplary devices, the gasket was composed of a rubber specially formulated for use in contact with battery acid (approximately 30 percent sulfuric acid in aqueous solution). Common antiozonants and other additives in many commercial rubber gasket materials were found to leach out of rubbers in acid solutions. These chemicals are detrimental to the operation of batteries which must be kept in a charged state for long periods of time (e.g., standby batteries in telephone central offices). In order to withstand ozone attack and the resulting cracking and loss of seal, the rubber was formulated to be, as nearly as possible, free of unsaturated chemical bonds. This was accomplished by the use of a base hydrocarbon with no unsaturation in the principal chain and by providing the curing agents in an amount in excess of that needed to completely react the prepolymer.

The base material was an ethylene-propylene-diene terpolymer. The cured (cross-linked) products of this class of materials are known to be resistant to ozone attack and are suggested for use in situations, for example, where corona discharge produces ozone in relatively high concentration, a situation not of particular concern in most battery uses. The terpolymer materials used are commonly referred to as EPDM (ethylene-propylene-diene-monomer), the diene constituent varying from manufacturer to manufacturer, with property difference not critical to this use.

An exemplary rubber was made using the following constituents:

| Parts by Weight | Constituent |
| --- | --- |
| 140 | oil extended EPDM |
| 30 | EPDM |
| 105 | carbon black |
| 5 | zinc oxide |
| 1 | stearic acid |
| 1.5 | benzothiazyl disulfide |
| 0.8 | tetramethylthiuram disulfide |
| 0.8 | dipentamethylenethiuram |
| 0.8 | copper dimethyldithiocarbamate |
| 1.0 | sulfur |

These constituents were mixed in a Banbury mill and cured for ten minutes at 170 degrees C. When tested in accordance with applicable ASTM testing procedures, the following results were obtained:

Hardness, Shore A ... 71
Tensile strength ... 2200 pounds per square inch
Elongation ... 380 percent
Tear strength, Die C ... 160 pounds per square inch
Compression set, 22 hours at 70 degrees C ... 9 percent.

The oil extender in one monomer component aids blending. The carbon black is a reenforcing agent. The zinc oxide and stearic acid are activators. The stearic acid is an accelerator. The sulfur is the curing agent. The remaining four constituents form an accelerator system. The constituents were chosen to be either not leached by acid solution or, if leached to some extent, to result in compounds which are not electrically active in acid solution. The monomer is chosen so as to produce a rubber with no significant content of unsaturated chemical bonds, so that the use of an antiozonant is not required.

If the contained liquid is aqueous, there are many polymeric materials (polymers, copolymers, polymer blends, etc.) which are not wettable. One such material consists essentially of polypropylene. Exemplary closure devices have been made of porous polypropylene. This porous material was manufactured by sintering a quantity of compressed polypropylene powder forming a body with an average pore size from 25 to 50 micrometers wide, the pores forming passages whose least dimensions are in that size range.

What is claimed is:

1. A vented container for a liquid, comprising a vessel with at least one aperture, a quantity of acidic aqueous solution within the vessel, and closure devices for sealing each said aperture against passage of the solution, at least one closure device including a body of a first material with a free surface on the liquid facing side thereof, said first material including venting passages extending from the interior of the vessel to the exterior of the vessel, wherein the first material is not wettable by the solution and the body includes venting passages from 10 to 200 micrometers wide with no such passage greater than 200 micrometers in width at its narrowest portion, whereby the container is effectively closed to solution spillage while permitting venting of a gas; which said at least one closure device includes engaging means for sealably engaging the vessel, which said engaging means includes an engaging member of a second material, which said engaging member includes a shell of the second material, which shell possesses no significant porosity, which said engaging means further includes a gasket consisting essentially of a cross linked ethylene propylene diene terpolymer.

2. A vented secondary storage cell, comprising a vessel with at least one aperture, a quantity of aqueous battery acid within the vessel, and closure devices for sealing each said aperture against passage of the battery acid, at least one closure device including a body of a first material with a free surface on the liquid facing side thereof, said first material including venting passages extending from the interior of the vessel to the exterior of the vessel, wherein the first material is not wettable by the battery acid and the body includes venting passages from 10 to 200 micrometers wide with no such passage greater than 200 micrometers in width at its narrowest portion, whereby the container is effectively closed to battery acid spillage while permitting venting of a gas; which said at least one closure device includes engaging means for sealably engaging the vessel; which said engaging means includes an engaging member of a second material; which said engaging member includes a shell of the second material, which shell possesses no significant porosity, which said engaging means further includes a gasket characterized in that the gasket consists essentially of a rubber of essentially saturated chemical bonding which rubber includes a base hydrocarbon with no unsaturation in the principal chain and curing agent in excess of that needed to completely react a prepolymer consisting essentially of the base hydrocarbon said rubber being free from significant quantities of materials which produce electrically active leachants in contact with the battery acid.

3. A device of claim 1 in which the gasket consists essentially of a cross linked ethylene propylene diene terpolymer.

* * * * *